(12) United States Patent
Bialer et al.

(10) Patent No.: US 10,444,347 B2
(45) Date of Patent: Oct. 15, 2019

(54) ACCURATE SELF LOCALIZATION USING AUTOMOTIVE RADAR SYNTHETIC APERTURE RADAR

(71) Applicant: GM GLOBAL TECHNOLOGY OPERATIONS LLC, Detroit, MI (US)

(72) Inventors: Oded Bialer, Petah Tivak (IL); Igal Bilik, Rehovot (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 363 days.

(21) Appl. No.: 15/407,056

(22) Filed: Jan. 16, 2017

(65) Prior Publication Data
US 2018/0149744 A1    May 31, 2018

Related U.S. Application Data

(60) Provisional application No. 62/428,210, filed on Nov. 30, 2016.

(51) Int. Cl.
*G01S 13/93* (2006.01)
*G01S 13/90* (2006.01)
(Continued)

(52) U.S. Cl.
CPC ............ *G01S 13/931* (2013.01); *G01S 7/412* (2013.01); *G01S 13/06* (2013.01); *G01S 13/90* (2013.01); *G01S 2013/9342* (2013.01)

(58) Field of Classification Search
CPC ......... G01S 13/90; G01S 13/931; G01S 7/412
See application file for complete search history.

(56) References Cited

U.S. PATENT DOCUMENTS 3,737,120 A * 6/1973 Green ................... F41G 7/2226
                                                              244/3.17
3,879,728 A * 4/1975 Wolff ...................... F41G 7/343
                                                              244/3.17
(Continued)

FOREIGN PATENT DOCUMENTS

JP          2009110249         5/2009

OTHER PUBLICATIONS

Gu et al.; "Passive Sensor Integration for Vehicle Self-Localization in Urban Traffic Environment," Sensors, 2015, 15, pp. 30119-30220.
(Continued)

*Primary Examiner* — Peter M Bythrow
(74) *Attorney, Agent, or Firm* — Cantor Colburn LLP (57) ABSTRACT

A vehicle, driving system and method for driving a vehicle is disclosed. The driving system includes a radar system, a processor and an autonomous driving system. The radar system obtains an SAR measurement of a static object in an environment of the vehicle. The processor obtains a first estimate of a location of the vehicle in the environment, obtains from a database a representation of a static object in the environment associated with the first estimate of the location, and compares the SAR measurement of the static object to the representation of the static object from the database to obtain a second estimate of the location of the vehicle. The autonomous driving system drives the vehicle through the environment based on the second estimate of the location of the vehicle.

20 Claims, 4 Drawing Sheets

(51) Int. Cl.
*G01S 7/41* (2006.01)
*G01S 13/06* (2006.01)

(56) References Cited

U.S. PATENT DOCUMENTS

| | | | | |
|---|---|---|---|---|
| 4,495,580 A * | 1/1985 | Keearns | ............... | G01C 21/005 342/64 |
| 4,520,445 A * | 5/1985 | Keearns | ............... | G01C 21/005 342/65 |
| 4,692,765 A * | 9/1987 | Politis | ............... | G01S 13/90 342/106 |
| 4,910,520 A | 3/1990 | Rosen et al. | | |
| 4,985,704 A | 1/1991 | Smith | | |
| 5,061,931 A | 10/1991 | Farina et al. | | |
| 5,485,384 A * | 1/1996 | Falconnet | ........... | G01C 21/165 342/25 A |
| 6,453,223 B1 * | 9/2002 | Kelly | ............... | G05D 1/0246 318/587 |
| 7,395,156 B2 * | 7/2008 | Chiou | ............... | G01S 7/40 342/65 |
| 8,548,194 B1 * | 10/2013 | Lyon | ............... | G01C 5/005 382/103 |
| 8,569,669 B2 * | 10/2013 | Holicki | ............... | G01C 21/005 244/3.1 |
| 8,766,975 B2 * | 7/2014 | Mohr | ............... | G01C 11/00 345/418 |
| 8,949,024 B2 * | 2/2015 | Stanley | ............... | G05D 1/0257 340/988 |
| 9,074,848 B1 * | 7/2015 | Hunter, Jr. | ........... | F41G 7/2226 |
| 9,239,383 B2 * | 1/2016 | Jin | ............... | G01S 13/90 |
| 9,528,834 B2 * | 12/2016 | Breed | ............... | B60R 21/0132 |
| 9,772,395 B2 * | 9/2017 | Park | ............... | G06K 9/00771 |
| 9,881,379 B2 * | 1/2018 | Iimura | ............... | G06T 7/74 |
| 10,203,409 B2 * | 2/2019 | Bueschenfeld | ......... | G01S 13/89 |
| 2002/0147544 A1 * | 10/2002 | Nicosia | ............... | F21V 21/108 701/500 |
| 2011/0233322 A1 * | 9/2011 | Holicki | ............... | G01C 21/005 244/3.16 |
| 2012/0271540 A1 * | 10/2012 | Miksa | ............... | G01C 21/30 701/409 |
| 2015/0198711 A1 * | 7/2015 | Zeng | ............... | G01S 13/726 342/59 |
| 2015/0378015 A1 * | 12/2015 | You | ............... | G01S 13/06 701/469 |

OTHER PUBLICATIONS

Vehicle Self-Localization Using High-Precision Digital Maps, https://www.forwiss.uni-passau.de/extern/doc/Thesis_Schindler.pdf.

* cited by examiner

ACCURATE SELF LOCALIZATION USING AUTOMOTIVE RADAR SYNTHETIC APERTURE RADAR

CROSS REFERENCE TO RELATED APPLICATIONS

The present application claims priority to U.S. Provisional Application Ser. No. 62/428,210, filed on Nov. 30, 2016, the contents of which are incorporated herein by reference in their entirety.

INTRODUCTION

The subject invention relates to autonomous driving in vehicles and, in particular, to a system and method for estimating a location of a vehicle within a landscape or environment in order to allow for autonomous driving of the vehicle through the environment.

Digital maps can be provided to a vehicle dynamically in order to provide a driver with a reasonable local map indicating his driving route. However, the current positioning systems provide a location of a vehicle that has an error of up to several meters. While an error of this magnitude may not prevent a human driver from correctly driving the vehicle through its environment, autonomous driving systems require tighter error controls in order to allow for safe driving of the vehicle. Accordingly, there is a need to estimate a location of the vehicle within its environment to a high degree of accuracy in order to enable autonomous driving systems.

SUMMARY

In one exemplary embodiment, a method of driving a vehicle is disclosed. The method includes obtaining at a processor of the vehicle a first estimate of a location of the vehicle in an environment, obtaining from a database a representation of a static object in the environment associated with the first estimate of the location, and obtaining a synthetic aperture radar (SAR) measurement of the static object in the environment. The SAR measurement of the static object is compared to the representation of the static object from the database to obtain a second estimate of the location of the vehicle, and the vehicle is driven through the environment based on the second estimate of the location of the vehicle.

The database may include one of: (i) a digital map; (ii) a digital map augmented by previous SAR measurements; and (iii) a composite image created from previous SAR measurements.

Driving the vehicle through the environment based on the second estimate of the location of the vehicle may include performing a maneuver suitable for the vehicle's environment given the second estimate of the location.

Comparing the SAR measurement of the static object to the representation of the static object may include at least one of: (i) comparing a size of the SAR measurement of the static object to the size of the representation of the static object; (ii) comparing relative angles of the SAR measurement of the static object and the representation of the static object; and (iii) comparing relative ranges of the SAR measurement of the static object and the representation of the static object.

A training stage and/or a localization stage may be performed upon receiving the SAR measurement. The training stage includes obtaining an estimate of a location of the vehicle, obtaining an SAR measurement at the estimated location of the vehicle and creating the representation of the static object in the database with the SAR measurement and its associated estimate of the location of the vehicle. The localization stage further comprises matching the SAR measurement to the representation of the static object stored in a database.

In another exemplary embodiment, a driving system for a vehicle is disclosed. The driving system includes a radar system, a processor and an autonomous driving system. The radar system obtains a synthetic aperture radar (SAR) measurement of a static object in an environment of the vehicle. The processor obtains a first estimate of a location of the vehicle in the environment, obtains from a database a representation of a static object in the environment associated with the first estimate of the location, and compares the SAR measurement of the static object to the representation of the static object from the database to obtain a second estimate of the location of the vehicle. The autonomous driving system drives the vehicle through the environment based on the second estimate of the location of the vehicle.

The database may include one of: (i) a digital map; (ii) a digital map augmented by previous SAR measurements; and (iii) a composite image created from previous SAR measurements.

The autonomous driving system may drive the vehicle through the environment based on the second estimate of the location of the vehicle by performing a maneuver suitable for the vehicle's environment given the second estimate of the location.

The processor may compare the SAR measurement of the static object to the representation of the static object by performing at least one of: (i) comparing a size of the SAR measurement of the static object to the size of the representation of the static object; (ii) comparing relative angles of the SAR measurement of the static object and the representation of the static object; and (iii) comparing relative ranges of the SAR measurement of the static object and the representation of the static object.

The processor may also perform at least one of: (i) a training stage; and (ii) a localization stage, upon receiving the SAR measurement at the radar system. The training stage includes obtaining an estimate of a location of the vehicle, obtaining an SAR measurement at the estimated location of the vehicle and creating the representation of the static object in the database with the SAR measurement and its associated estimate of the location of the vehicle. The localization stage further comprises matching the SAR measurement to the representation of the static object stored in a database.

In yet another exemplary embodiment, a vehicle is disclosed. The vehicle includes a radar system, a processor and an autonomous driving system. The radar system obtains a synthetic aperture radar (SAR) measurement of a static object in an environment of the vehicle. The processor obtains a first estimate of a location of the vehicle in the environment, obtains from a database a representation of a static object in the environment associated with the first estimate of the location, and compares the SAR measurement of the static object to the representation of the static object from the database to obtain a second estimate of the location of the vehicle. The autonomous driving system drives the vehicle through the environment based on the second estimate of the location of the vehicle.

The database may include one of: (i) a digital map; (ii) a digital map augmented by previous SAR measurements; and (iii) a composite image created from previous SAR measurements.

The autonomous driving system may drive the vehicle through the environment based on the second estimate of the location of the vehicle by performing a maneuver suitable for the vehicle's environment given the second estimate of the location.

The processor may compare the SAR measurement of the static object to the representation of the static object by performing at least one of: (i) comparing a size of the SAR measurement of the static object to the size of the representation of the static object; (ii) comparing relative angles of the SAR measurement of the static object and the representation of the static object; and (iii) comparing relative ranges of the SAR measurement of the static object and the representation of the static object.

The processor may perform at least one of: (i) a training stage; and (ii) a localization stage, upon receiving the SAR measurement at the radar system. The training stage includes obtaining an estimate of a location of the vehicle, obtaining an SAR measurement at the estimated location of the vehicle and creating the representation of the static object in the database with the SAR measurement and its associated estimate of the location of the vehicle. The localization stage further comprises matching the SAR measurement to the representation of the static object stored in a database.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
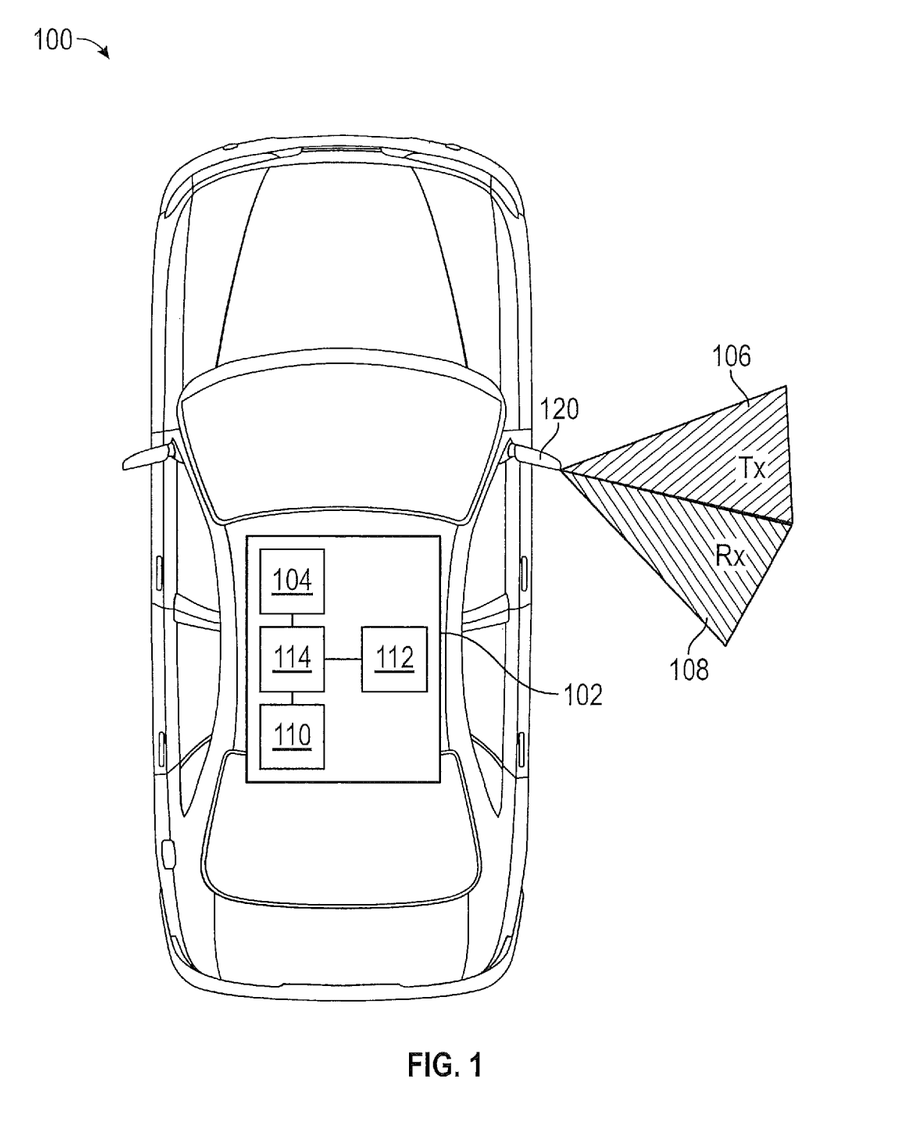
FIG. 1 shows a vehicle including a system for performing autonomous driving according to the methods disclosed herein, in an embodiment.

In accordance with an exemplary embodiment, FIG. 1 shows a vehicle 100 including a system 102 for performing autonomous driving according to the methods disclosed herein, in an embodiment. The system 102 determines a location of the vehicle 100 within its environment and uses the location of the vehicle 100 to drive the vehicle through its environment autonomously. The system 102 includes a radar system 104 for imaging an object in the environment near the vehicle 100. The radar system 104 includes a side-looking transmitter 106 and a side-looking receiver 108. In the embodiment of FIG. 1, the side-looking transmitter 106 and a side-looking receiver 108 are located in a passenger's side view mirror 120 of the vehicle 100. However, this is not meant to be a limitation on the disclosure. The side-looking transmitter 106 and a side-looking receiver 108 may form a single radar system 104 or alternately may be part of a MIMO (multi-input, multi-output) radar system that includes an array of transmitters and an array of receivers.

As the vehicle 100 is driving along a route, the side-looking transmitter 106 and a side-looking receiver 108 are operated to form a synthetic aperture radar (SAR) that creates images of objects to the side of the vehicle. SAR uses the motion of a radar antenna over a targeted region to provide finer spatial resolution than is possible with stationary beam-scanning radars. To create a SAR image, successive pulses of radio waves are transmitted to "illuminate" an object scene, and the echo of each pulse is received and recorded. The pulses are transmitted and the echoes received using a single beam-forming antenna. As the vehicle moves, the antenna location relative to the object changes with time. Signal processing of the successive recorded radar echoes allows the recordings from these multiple antenna positions to be combined in order to create high resolution images.

The system 102 further includes a database 110 that includes mapping data of the local environment. The mapping data can include a digital map that includes the various static objects within the environment along with their associated locations. Such static objects may include buildings, bridges, signs, poles, guardrails, fire hydrants, etc. In one embodiment, the mapping data can be provided to the database from an independent mapping source or service. In one embodiment, SAR measurements that are obtained at the vehicle 100 are used to build upon this digital map, thereby refining the relative locations of the vehicle 100 with respect to the static objects represented in the digital map, as discussed below with respect to FIG. 5.

The system 102 further comprises an autonomous driving system 112 that drives the vehicle based on an estimated location of the vehicle 100. A processor 114 operates the radar system 102 and database 110, as discussed herein, in order to provide an estimate of a location of the vehicle 100 to the autonomous driving system 112 that allows the autonomous driving system to drive through the vehicle's environment. The estimated location may be a location on a geo-centric grid or a location with respect to the static object.

Figure 2:
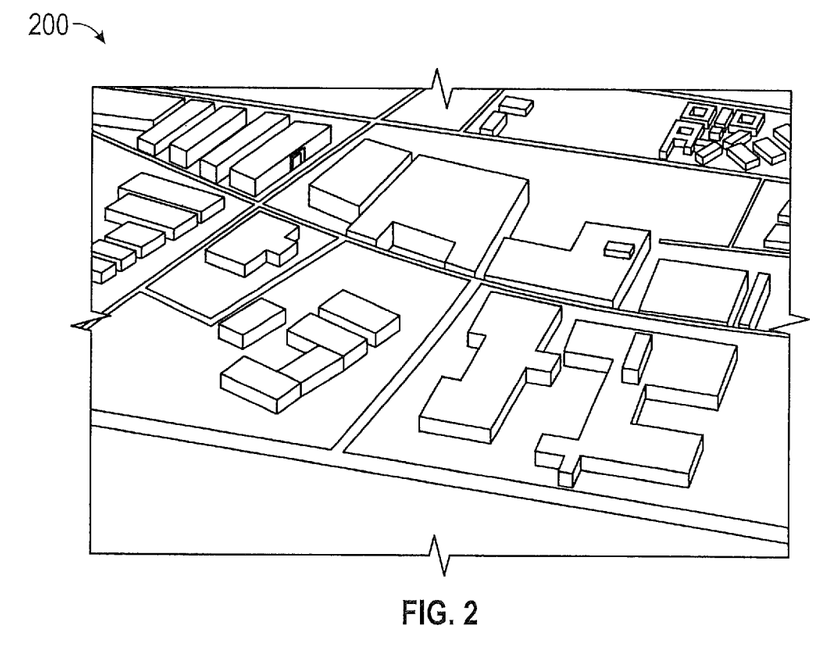
FIG. 2 shows an exemplary digital map of an environment through which a vehicle might drive and which may be stored in database.

FIG. 2 shows an exemplary digital map 200 of an environment through which a vehicle 100 might drive and which may be stored in database 110. The digital map provides a three-dimensional landscape of the environment, allowing the driver or autonomous driving system 112 to have a street-level image of the environment. The static objects in the database may be labelled so that their positions in the environment are known. Such positions can be a geo-centric location of the objects. In one embodiment, the digital map allows the driver or the autonomous driving system 112 to locate itself within the digital map and provides an image as viewed from the selected location, including various landmarks and other static objects of the selected location.

Figure 3:
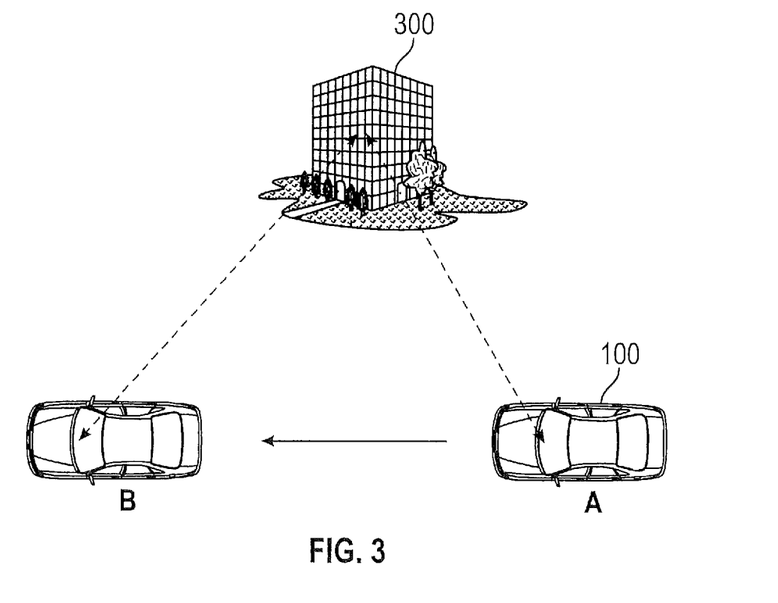
FIG. 3 shows an operation of the vehicle in order to determine its location with respect to a static object in the environment.

FIG. 3 shows an operation of the vehicle 100 in order to determine its location with respect to a static object 300 in the environment. In FIG. 3 static object 300 is a building. As vehicle 100 drives from point A to point B with its side-looking transmitter 106 and side-looking receiver 108 activated, the radar system 104 receives SAR measurements that can be used to create an SAR image of the static object 300. The SAR image can be compared to the representation of the static object extracted from the digital map stored in database 110. Once a match between the SAR image and the representation of the static object in the digital map has been determined, the location of the vehicle with respect to the static object can be estimated to within a selected error. In various embodiments, the location error is less than about 10 centimeters.

In addition to using the SAR measurement along with the digital map in database 110 to determine the location of the vehicle 100 with respect to a static object 300 in the environment, the SAR measurement can be added to the database in order to augment the digital map. Each time the vehicle 100 passes the static object 300 and obtains an SAR image, the SAR image can be added to previously recorded SAR measurements, and the multiple SAR image can be used to create a composite SAR measurement. A subsequent SAR image can be compared to the composite SAR image in order to estimate the location of the vehicle. These methods are discussed in detail herein with respect to FIGS. 4-6.

Figure 4:
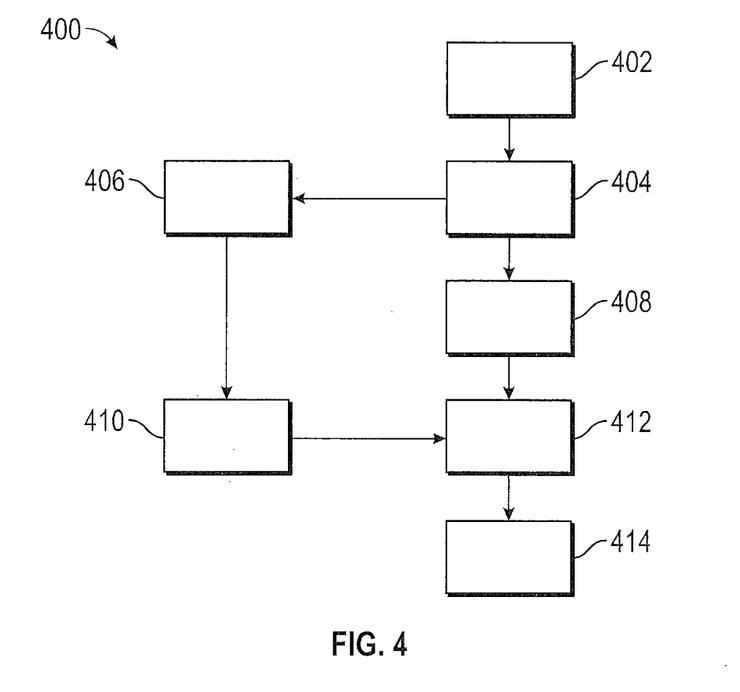
FIG. 4 shows a method of determining a location of vehicle with respect to its environment in an embodiment.

FIG. 4 shows a method of determining a location of vehicle with respect to its environment in an embodiment. In box 402, an initial measurement of the location of the vehicle is obtained. The initial measurement can be a Global Positioning System (GPS) measurement or a measurement obtained using another geo-location system. In box 404, the initial measurement is used to provide an approximate self-localization of the vehicle, otherwise referred to as a first estimate of the location of the vehicle. In box 406, the first estimate is used to determine a location of the vehicle within a digital map stored in database 110. Once the location of the vehicle within the digital map is determined, various representations of static objects within the location of the vehicle can be extracted or obtained from the digital map (box 410) corresponding to the location of the vehicle within the digital map. Alternatively an image associated with the location of the vehicle can be extracted from the digital map, where the image includes the representations of the various objects. Returning to box 404, as the car is driven SAR measurements are obtained and processed in order to provide an SAR image that corresponds with the first estimate of the location (box 408). In box 412, the SAR image from box 408 is compared to the image extracted from the digital map in box 410. When these images match each other to within a selected criterion, a second estimate for the location of the vehicle is determined (box 414). More particularly, static objects found in the SAR image can be compared to the representations of the static objects found in the image from the database 110 to determine the location of the vehicle with respect to the static objects. In one embodiment, relative sizes of the representation of the static object from the database and the SAR measurement of the static object can be used to determine a relative distance from the static object. Also, relative angles in the SAR image of the static object and the representation of the static object can be used to determine an angular displacement of the vehicle with respect to the static object, and relative ranges of the SAR measurement of the static object and the representation of the static object can be used to determine relative distance from the static object. The method of FIG. 4 provides a second estimate of the vehicle's location that is more accurate than the first estimate of the vehicle's location.

Figure 5:
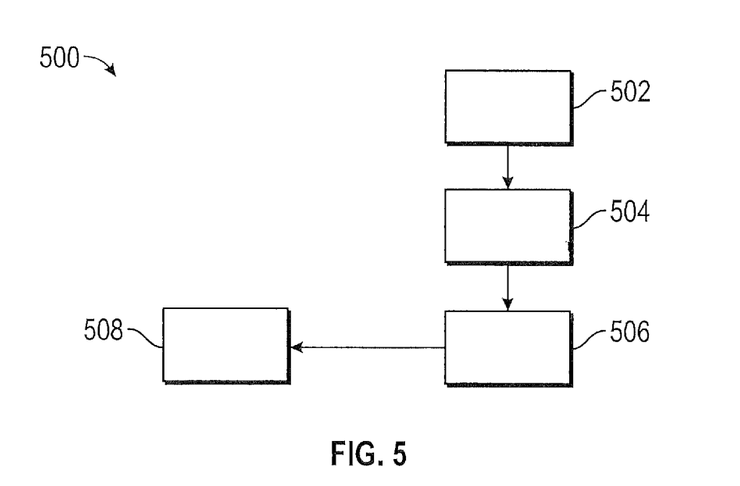
FIG. 5 shows a flowchart illustrating a method of building up a database of synthetic aperture radar (SAR) measurements using approximate vehicle locations in order to create a digital map of the vehicle's environment.
Figure 6:
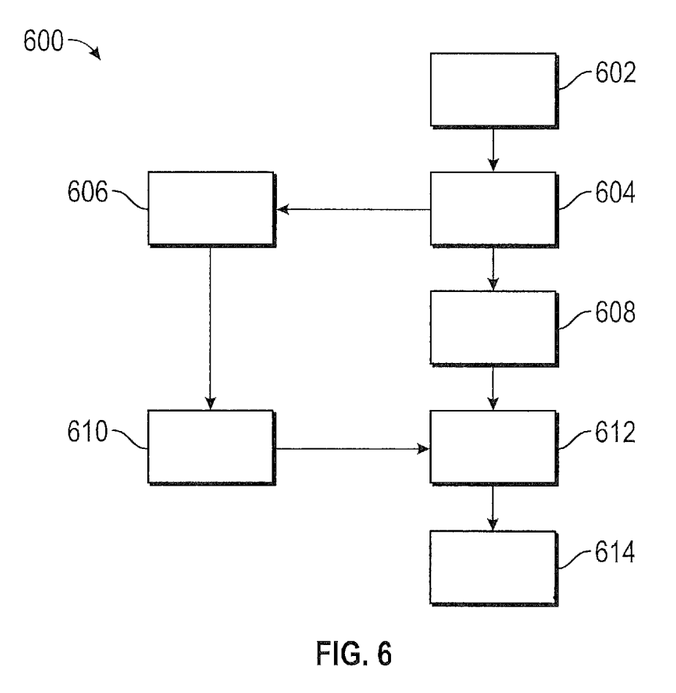
FIG. 6 shows a flowchart illustrating a method of determining a vehicle location using a SAR measurement and database created during the method of FIG. 5.

FIGS. 5 and 6 outline a two-stage process for estimating a location of the vehicle within an environment. FIG. 5 shows a first stage, also known as a training stage, in which SAR measurements are stored in a database in order to create a map for subsequent use. FIG. 6 shows a second stage, also known as a localization stage, in which an SAR measurement is compared to one or more SAR measurements stored in the database 110 in order to obtain an estimate of the location of the vehicle.

Returning to FIG. 5, a flowchart 500 illustrates a method of building up a database of SAR measurements using approximate vehicle locations in order to create a digital map of the vehicle's environment. In box 502, GPS measurements or other types of geo-location measurements are received at the vehicle. From these measurements, an approximate estimate of the vehicle location (a "first estimate") is obtained in box 504. SAR measurements are obtained and processed in box 506 and are associated with the estimate of the location. In various embodiments, the SAR measurements are being continuously obtained and processed and thus can be obtained simultaneously with receiving the estimate of the location with which it is associated. In box 508, a database is created using the estimate of the location of the vehicle and the SAR measurement associated with the estimate of the location. When the vehicle drives by the location a second time, another SAR measurement is associated with the estimate of the location and recorded in the database. In one embodiment, a plurality of SAR measurements for a same particular location is used to create a composite SAR measurement in the database for the particular location. In another embodiment, the SAR measurements for a particular location are used along with a pre-existing digital map in order to augment the part of the digital map associated with the particular location.

FIG. 6 shows a flowchart 600 illustrating a method of determining a vehicle location using a SAR measurement during a localization stage using the SAR database created during the training stage of FIG. 5. In box 602, an initial measurement of the location of the vehicle is obtained. The initial measurement can be a Global Positioning System (GPS) measurement or other geo-location measurement. In box 604, the initial measurement is used to provide an approximate self-localization or a first estimate of the location of the vehicle. In box 606, the first estimate is used to determine a location of the vehicle within the database formed during the training stage of FIG. 5. Given the first estimate of the location of the vehicle within the trained database, in box 610 various static objects associated with estimate of the location are extracted from the digital map. In one embodiment, a composite image associated with the first estimate of the location of the vehicle is extracted from the trained database and the composite image includes the various static objects. Returning to box 604, as the car is driven SAR measurements are obtained in box 608 that provide an SAR image corresponding with the first estimate of the location. In box 612, the SAR image from box 608 is compared to the composite image extracted from the trained database at box 610. When these images match each other to within a selected criterion, a second estimate for the location of the vehicle is determined (box 614). The second estimate is generally more accurate than the first estimate. In various embodiments, an error associated with the second estimate of the location is less than 10 centimeters.

In various embodiments, an SAR measurement can both be used to determine the second estimate of the location of the vehicle (as discussed with respect to FIG. 6) and to build up the database (as discussed with respect to FIG. 5). Thus, a single SAR measurement can be used as part of the training stage and the localization stage.

At some vehicle locations, the SAR measurement may not return an image of a static object. In such instances when no static objects are to be found, dead reckoning or other self-localization methods can be used to estimate a location of the vehicle.

Once the second estimate of the location has been estimated, the second estimate can be sent to the autonomous driving system 112. The autonomous driving system 112 can drive through the environment of the vehicle using the second estimate of the location as its starting point. The accuracy of the second estimate of the location obtained using the methods disclosed herein is suitable to allow the autonomous driving system 112 to drive safely through the environment. It is understood that as the methods disclosed can be used at multiple locations along a route as the vehicle drives through the environment. The location estimates at these multiple locations are provided to the autonomous driving system 112, thereby allowing the autonomous driving system 112 to have an updated estimate of the vehicle's location within its environment.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A method of driving a vehicle, comprising:
   obtaining at a processor of the vehicle a first estimate of a location of the vehicle in an environment;
   obtaining a synthetic aperture radar (SAR) measurement of the static object in the environment;
   obtaining from a database a representation of a static object in the environment associated with the first estimate of the location, wherein the representation includes a previously obtained SAR measurement of the static object;
   comparing the SAR measurement of the static object to the representation of the static object from the database to obtain a second estimate of the location of the vehicle; and
   driving the vehicle through the environment based on the second estimate of the location of the vehicle.

2. The method of claim 1, wherein the database includes one of: (i) a digital map augmented by previous SAR measurements; and (ii) a composite image created from previous SAR measurements.

3. The method of claim 1, wherein driving the vehicle through the environment based on the second estimate of the location of the vehicle further comprises performing a maneuver suitable for the vehicle's environment given the second estimate of the location.

4. The method of claim 1, wherein comparing the SAR measurement of the static object to the representation of the static object further comprises at least one of: (i) comparing a size of the SAR measurement of the static object to the size of the representation of the static object; (ii) comparing relative angles of the SAR measurement of the static object and the representation of the static object; and (iii) comparing relative ranges of the SAR measurement of the static object and the representation of the static object.

5. The method of claim 1, wherein, upon receiving the SAR measurement, an action is performed in at least one of: (i) a training stage; and (ii) a localization stage.

6. The method of claim 5, wherein the training stage includes obtaining an estimate of a location of the vehicle, obtaining an SAR measurement at the estimated location of the vehicle and creating the representation of the static object in the database with the SAR measurement and its associated estimate of the location of the vehicle.

7. The method of claim 5, wherein the localization stage further comprises matching the SAR measurement to the representation of the static object stored in a database.

8. A driving system for a vehicle, comprising:
   a radar system for obtaining a synthetic aperture radar (SAR) measurement of a static object in an environment of the vehicle;
   a processor that:
      obtains a first estimate of a location of the vehicle in the environment,
      obtains from a database a representation of a static object in the environment associated with the first estimate of the location, wherein the representation includes a previously obtained SAR measurement of the static object, and
      compares the SAR measurement of the static object to the representation of the static object from the database to obtain a second estimate of the location of the vehicle; and
   an autonomous driving system for driving the vehicle through the environment based on the second estimate of the location of the vehicle.

9. The driving system of claim 8, wherein the database includes one of: (i) a digital map augmented by previous SAR measurements; and (ii) a composite image created from previous SAR measurements.

10. The driving system of claim 8, wherein the autonomous driving system drives the vehicle through the environment based on the second estimate of the location of the vehicle by performing a maneuver suitable for the vehicle's environment given the second estimate of the location.

11. The driving system of claim 8, wherein the processor compares the SAR measurement of the static object to the representation of the static object by performing at least one of: (i) comparing a size of the SAR measurement of the static object to the size of the representation of the static object; (ii) comparing relative angles of the SAR measurement of the static object and the representation of the static object; and (iii) comparing relative ranges of the SAR measurement of the static object and the representation of the static object.

12. The driving system of claim 8, wherein the processor performs at least one of: (i) a training stage; and (ii) a localization stage, upon receiving the SAR measurement at the radar system.

13. The driving system of claim 12, wherein the training stage includes obtaining an estimate of a location of the vehicle, obtaining an SAR measurement at the estimated location of the vehicle and creating the representation of the static object in the database with the SAR measurement and its associated estimate of the location of the vehicle.

14. The driving system of claim 12, wherein the localization stage further comprises matching the SAR measurement to the representation of the static object stored in a database.

15. A vehicle, comprising:
a radar system for obtaining a synthetic aperture radar (SAR) measurement of a static object in an environment of the vehicle;
a processor that:
obtains a first estimate of a location of the vehicle in the environment,
obtains from a database a representation of a static object in the environment associated with the first estimate of the location, wherein the representation includes a previously obtained SAR measurement of the static object, and
compares the SAR measurement of the static object to the representation of the static object from the database to obtain a second estimate of the location of the vehicle; and
an autonomous driving system for driving the vehicle through the environment based on the second estimate of the location of the vehicle.

16. The vehicle of claim 15, wherein the database includes one of: (i) a digital map augmented by previous SAR measurements; and (ii) a composite image created from previous SAR measurements.

17. The vehicle of claim 15, wherein the autonomous driving system drives the vehicle through the environment based on the second estimate of the location of the vehicle by performing a maneuver suitable for the vehicle's environment given the second estimate of the location.

18. The vehicle of claim 15, wherein the processor compares the SAR measurement of the static object to the representation of the static object by performing at least one of: (i) comparing a size of the SAR measurement of the static object to the size of the representation of the static object; (ii) comparing relative angles of the SAR measurement of the static object and the representation of the static object; and (iii) comparing relative ranges of the SAR measurement of the static object and the representation of the static object.

19. The vehicle of claim 15, wherein the processor performs at least one of: (i) a training stage; and (ii) a localization stage, upon receiving the SAR measurement at the radar system.

20. The vehicle of claim 19, wherein: (i) the training stage includes obtaining an estimate of a location of the vehicle, obtaining an SAR measurement at the estimated location of the vehicle and creating the representation of the static object in the database with the SAR measurement and its associated estimate of the location of the vehicle; and (ii) the localization stage further comprises matching the SAR measurement to the representation of the static object stored in a database.

* * * * *